3,149,071
APPARATUS FOR SEWAGE TREATMENT

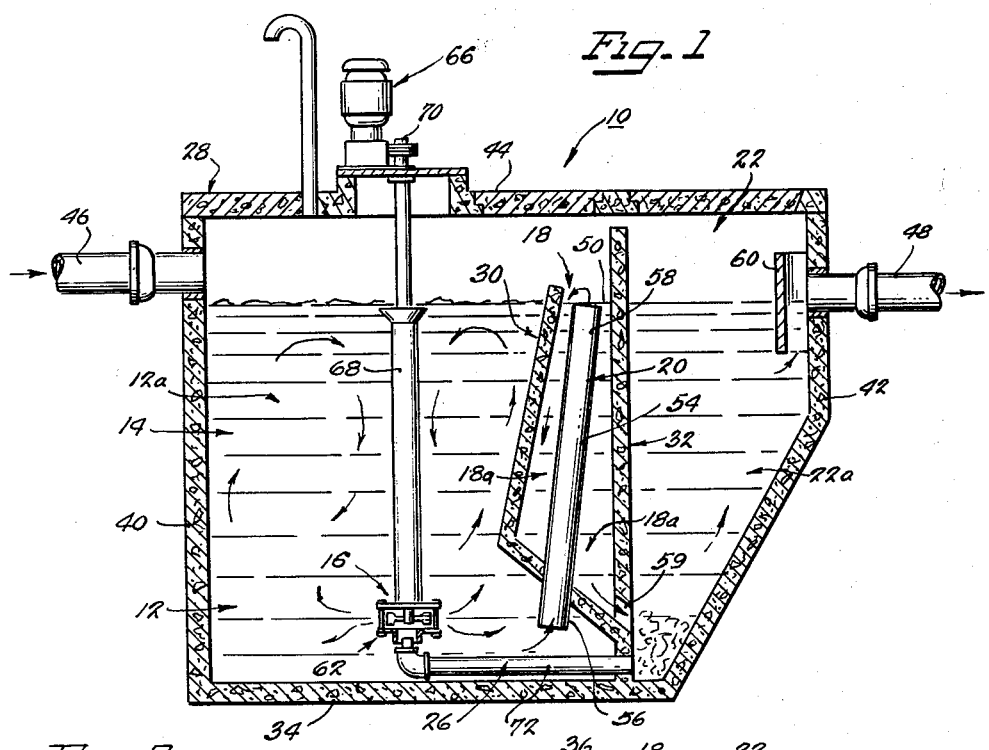
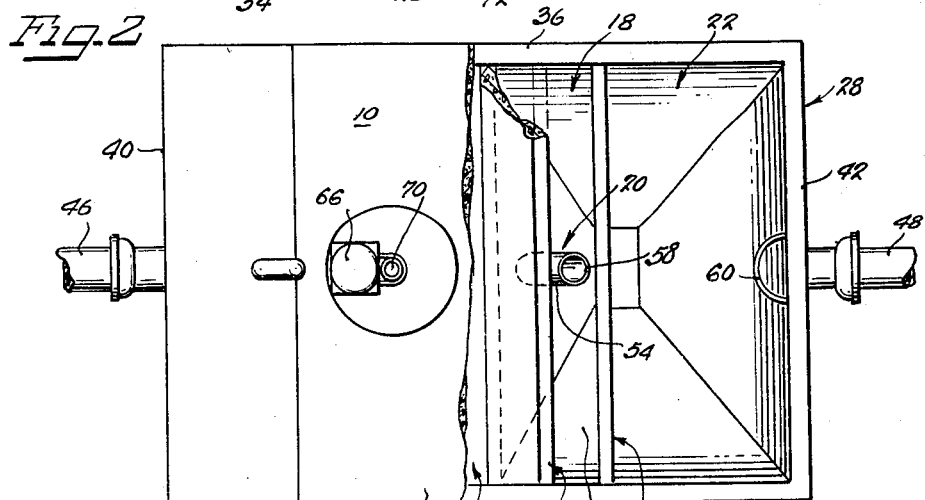
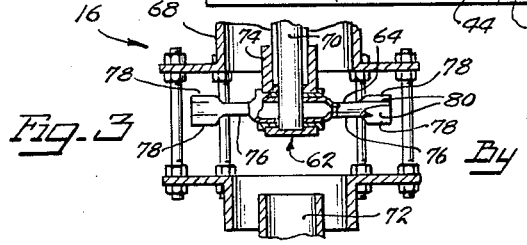

David W. Burgoon, Winnetka, and Emil J. Ciabattari, Chicago, Ill., assignors to Yeomans Brothers Company, Melrose Park, Ill., a corporation of Delaware
Filed May 11, 1961, Ser. No. 109,323
2 Claims. (Cl. 210—197)

The invention relates generally to sewage or waste material treatment, and more particularly to an improved tank structure for use in such treatment. It further relates to an improved method of treating such waste material.

Many homes, motels and the like are not serviced by any municipal sewage treatment system. Thus, it is necessary to handle the relatively small quantities of waste material which they produce. For a long time, no effective means was available which was not cumbersome and/or very costly. Recently, the problem has been quite effectively solved by the aerobic treatment of waste material in relatively small tanks that are equipped with aerating means utilizing the cavitation effect. Examples of such development are set forth in U.S. patent applications Serial Numbers 551,053 and 697,835, now U.S. Patent No. 2,987,186. The present invention is directed to an improved tank structure which is particularly advantageous when used in conjunction with the subject matter of these patent applications. It is also directed to an improved method which, likewise, is particularly advantageous when used with this subject matter.

The primary object of the present invention is to provide improved structure for more effectively treating waste material or sewage. It is a further object to provide an improved method for efficient treatment of waste material. A more specific object is to provide sewage treatment apparatus including a settling zone, which minimizes accumulation of scum or floatable matter such as would interfere with the proper treatment of the waste material. Another object is to provide apparatus of the type described above, including means affording a suitable sludge return and retention to effectively treat the waste material. It is also an object of this invention to provide such an improved sewage treatment apparatus which is highly effective, yet compact in arrangement and simple and economical to operate.

Other objects and advantages will become obvious from the following description and accompanying drawings.

In the drawings:

FIGURE 1 is a side elevation, partly in section, of treatment apparatus embodying the present invention;

FIGURE 2 is a plan view of the apparatus shown in FIG. 1, portions being broken away to illustrate certain details of construction; and FIGURE 3 is an enlarged sectional view of a portion of the aerating means of the illustrated apparatus.

The apparatus and method of this invention are directed generally to the aerobic treatment of waste material or sewage by aeration accompanied by allowing the settable matter in the waste material to settle out.

The treatment apparatus 10 shown in the drawings embodies the structural features of the invention, and is, in addition, adapted to operate in accordance with the method of the present invention. The apparatus 10 comprises generally an aeration or treatment compartment 12 for receiving and holding a quantity of liquid-borne waste material which will be referred to as liquor 14. Aerating means 16 is provided in compartment 12 and is operable to supply oxygen to the liquor 14 at a position substantially below its upper surface. The apparatus 10 further includes an intermediate or first settling or clarifying compartment 18 and conduit means 20 for conducting liquor 14 from the lower part of the aeration compartment 12 to the intermediate compartment 18. Also included are a final or second settling or clarifying compartment 22, for holding and discharging the aerated liquor 14, and means for conducting liquor from the intermediate compartment 18 to the final settling compartment 22. The apparatus 10 is also provided with a sludge return or recirculating means 26 for conducting sludge (which is liquor having a high proportion of settled solids) from the final settling compartment 22 back to the aeration compartment 12 for further oxidation.

Before the illustrated structure is described in detail, its operation will be outlined, so as to facilitate a more ready and fuller understanding of the significance of the structural features.

The waste material liquor 14 is introduced into the aeration compartment 12 where it is supplied with oxygen, in the form of air, by the aerating means 16. Liquor 14 is conducted by the conduit means 20 from the bottom of the aeration compartment 12 to the top of the intermediate settling compartment 18. This arrangement greatly reduces the accumulation of scum and floatable material otherwise passed on to the final settling compartment 22, because the liquor taken from the bottom of the aeration compartment 12 contains little floatable material. Any accumulation of scum and floatable solids in the final settling compartment 22 is, of course, undesirable, primarily because it may eventually find its way out of the apparatus, and pollute the effluent, and also because it may serve to clog the sludge return means 26 to the aeration compartment.

The particular arrangement of the conduit means 20 and the intermediate settling compartment also serves to rapidly and effectively reduce the turbulence, imparted to the liquor in the aeration compartment, before it reaches the final settling compartment. This greatly facilitates the desired settling out of solids after the liquor leaves the aeration compartment. This quieting feature is particularly important in an apparatus, such as the one shown in the illustrated embodiment, which is quite compact and wherein the aerating means imparts considerable agitation to the liquor in the aeration compartment.

The liquor 14 is discharged into the upper end of the intermediate settling compartment 18 in such a way, and the compartment and conduit means 20 are so constructed, that some localized turbulence is created at the position of discharge, which turbulence tends to sink or submerge any floatable material which may be transmitted from the aeration compartment. This localized turbulence does not, however, interfere with the general quiescence of the liquor which is otherwise maintained in the intermediate compartment 18. The shape and disposition of compartment 18 and its intake and discharge openings serve to maintain the liquor in at least the lower portion of this compartment in a turbulence-free state.

The liquor passes from the bottom of the intermediate compartment 18 into the lower part of the final settling compartment 22. The arrangement of the intermediate and final settling compartments further facilitates and speeds up the settling or separating of the settleable solids. The lighter portion of the liquor 14 rises in the final compartment 22 and is discharged as the effluent of the apparatus. The sludge at the bottom of the final settling compartment 22 is recirculated, by the return means 26, to the aeration compartment 12 for further treatment in that compartment.

Thus, waste material may be readily and rapidly treated, and a relatively clear and highly innocuous effluent produced. The construction of the apparatus greatly minimizes the accumulation of scum or floating material in the device, particularly in the settling compartments where, as already noted, scum accumulation is highly undesirable.

Referring to FIGS. 1 and 2, the illustrated apparatus comprises generally a tank 28 having a pair of baffles or walls 30 and 32 forming the aeration or treatment, intermediate or first settling, and final or second settling compartments 12, 18 and 22, which define, respectively, the aeration or treatment, the intermediate or first settling, and the final or second settling zones or areas 12a, 18a and 22a.

The illustrated, generally rectangular tank 28 is constructed of a suitable material, such as concrete or steel, and includes a bottom wall 34, a pair of elongated side walls 36 and 38, and a pair of transverse or end walls, namely, front end wall 40 and rear end wall 42. A top 44, comprising a series of concrete slabs in the illustrated embodiment, is also provided to substantially enclose the structure. Suitable manholes or access openings may be provided in the tank top to permit servicing of the apparatus. An inlet 46 is provided by an opening in the end wall 40 adjacent the upper end of the tank 28 into which a conduit or tile is received for conveying liquid borne waste material into the tank. An effluent discharge or outlet 48 is provided by means of an opening in the rear end wall 42 into which an outlet conduit or the like is received, with the opening in the illustrated structure being slightly below the level of the inlet 46.

The second wall or baffle 32 extends the width of the tank 28 and is disposed in a generally vertical plane. The first or inclined wall or baffle 30 also extends across the width of the tank 28 and is disposed generally somewhat forwardly of the baffle 32, to form, together with said baffle 32 and parts of the side walls 36 and 38 of the tank, the intermediate settling compartment 18 of the device. The lower part of the first baffle 30 is comprised of three sections, which converge toward a point somewhat above the bottom of the tank 28 and are connected to the second baffle 32. The intermediate compartment 18 is thus provided with a generally funnel-like lower end terminating at a discharge opening 59 through the second baffle 32.

The upper part of the first baffle 30 is inclined rearwardly to provide the intermediate compartment 18 with a transversely elongated, narrow upper opening 50 which has a horizontal cross section that is considerably smaller than the cross section of that compartment 18 below the opening 50.

The first baffle 30 also serves as the rear wall for the aeration compartment 12, with the front end wall 40 and parts of the side walls 36 and 38 providing the other walls of that compartment 12. The upper edge of the first baffle 30 is located somewhat above the level of the liquor in the aerating compartment 12 under normal operating conditions of the apparatus, so that liquor from the upper part of the aeration compartment 12 will not pass directly over the baffle into the intermediate compartment 18.

In the illustrated apparatus 10, the conduit means 20, which conducts liquor 14 from the aeration compartment 12 to the intermediate compartment 18, includes a circular pipe, tube or the like providing a conduit 54 which is disposed generally centrally in the intermediate compartment 18. The conduit 54 is secured adjacent its lower end 56 to the lower part of the inclined baffle 30, and extends generally upwardly therefrom. The conduit 54 extends downwardly through the baffle 30 so that its open lower end 56 is located at a point near the bottom of the aeration compartment 12. The open upper end 58 of the conduit 54 is located at about the normal operating level of the liquor 14 at the narrowed upper opening 50 of the intermediate compartment 18. The upper end 58 spans, ni the front-to-rear direction, a major portion of the opening 50.

The final settling compartment 22 is formed by the vertical baffle 32, the rear wall 42 and parts of the side walls 36 and 38. The lower part of the rear end wall 42 is comprised of three sections which converge, extending inwardly toward the bottom of the final compartment 22 to give it a funnel-like bottom desirable for collecting sludge. The opening 59 through the lower part of the vertical baffle 32 allows passage of liquor 14 from the lower part of the intermediate compartment 18 into the lower part of the final compartment 22. A small semi-circular outlet baffle 60 is secured to the rear wall 42 adjacent the outlet 48 to prevent floatable material from being discharged as effluent.

While a variety of aerating means have been used to treat waste material liquor, and it should be understood that the present invention may be practiced using a variety of different aerating means, this invention provides very effective results when used with the aerating means 16 shown in the drawings which utilizes a cavitation effect to quickly and effectively treat the waste material liquor.

The aerating means 16 comprises, generally, a rotor unit 62 (shown in detail in FIG. 3), which is immersed in the liquor and rotated sufficiently rapidly to produce a zone of cavitation adjacent the ends of the rotor, into which zone air is introduced directly to provide oxygen for the waste material. The aerating means 16 includes means for conducting oxygen containing air to the rotor 62, motor means 66 for rotating the rotor 62, and a recirculation sleeve or draft tube 68.

More particularly, the rotor 62 is secured at the lower end of a hollow shaft 70, which is rotatably supported at its upper end on the top of the tank 28 and which has communication with the atmosphere. The shaft 70 extends generally downwardly into the aeration compartment 12, locating the rotor 62 centrally and a short distance from the bottom of that compartment. The lower end of the shaft 70 has fixed thereto a rotor hub 74, including a hollow central portion, having fluid communication with the hollow center of the shaft 70. The rotor hub 74 also includes a pair of diametrically opposed threaded openings which each receive the threaded inner end of a rotor arm 76. Each of the rotor arms 76 is essentially streamlined in cross-section and has mounted at its outer end a pair of vertically extending vanes 78. Each rotor arm 76 is hollow along its length and includes a pair of openings 80 at its outer end, each opening being directly in the rear of one of the vanes 78.

Rotation of the arms 76 at a relatively high speed is accompanied by a flow of air downwardly through the hollow shaft 70 and then through the hollow center of each of the arms 76 to the openings 80 at the outer tip of each arm. The relatively rapid movement of the vanes 78 through the liquid waste material produces a region of cavitation directly to the rear of each vane at the position of the openings 80. Consequently, the voids produced by the cavitation are occupied by the air being drawn from the atmosphere into the rotor arms 76 and discharged through the openings 80. As the voids or bubbles collapse, the air is transferred to the fluid waste material at a high efficiency rate and with a resulting dissolution of oxygen into the waste material.

The described cavitation effect not only produces oxygenation of the waste material, but it also aids substantially in the circulation of the waste material in the aeration compartment 12. The movement of the rotor arms 76 and the considerable shock forces resulting from the cavitation effect provide for movement of the waste material outwardly and upwardly from the zone of cavitation. There is also movement outwardly and downwardly, due to the vanes 78 and communicating openings 80 on the lower edges of the arms 76, and this downward movement serves to scour the bottom of the compartment 12 and also to assist the circulation of liquor into and through the pipe 54 leading to the intermediate compartment 18.

The upward circulation of the liquid in the aeration compartment 12 creates a downward flow through the draft tube 68, to thereby cause the liquid waste material at the upper portion of the aeration compartment to move into the zone of cavitation for oxidation of such material.

Structurally and functionally related to the aerating means 16 is the sludge return or recirculating means 26 which is comprised in the illustrated apparatus of a line or conduit 72. One end of the return line 72 extends through the vertical wall 32 so as to open into the bottom of the final settling compartment 22. The line 72 extends back from wall 32 along the bottom of the aerating compartment 12 to a position generally beneath the rotor unit 62, and then is turned upwardly, as seen in FIGS. 1 and 3, so that its opening is disposed a short distance below the rotor 62.

Now to consider the operation of the illustrated apparatus 10 as a whole and in fuller detail. Flow of liquor 14 through the apparatus 10 may be provided by locating the outlet 48 below the level of the inlet 46 or by providing the liquor to the apparatus under pressure. The general flow of waste material liquor thus produced is through the inlet 46 into the aeration compartment 12, through the conducting means 20 into the intermediate settling compartment 18, through the opening 59 into the final settling compartment 22, and finally out through the outlet 48 as purified effluent.

The aerating means 16 may be operated continuously, or periodically shut off to permit more effective settling as the particular situation requires. As noted above, the cavitation action in the aeration compartment 12 circulates and mixes the liquor in the compartment 12. It also contributes to the flow through the conduit 54. It should be observed that the amount of intensity of agitation produced in the liquor in the aeration compartment 12 not only depends upon the action of the particular type of aerating means used, but also is dependent upon the size and dimensions of the compartment. The illustrated compartment 12 is so constructed and is of a size such that considerable agitation is imparted to the liquor throughout a major portion of the aeration compartment. Thus, the liquor 14 in the aeration compartment 12 of the illustrated embodiment is in a considerably agitated state, and while this is desirable in this embodiment for more efficient and complete oxidation of the waste materials within the aeration compartment 12, it is likewise desirable that the condition of the liquor be changed, as rapidly and effectively as possible, to a state of quiescence which is conducive to the settling-out of the settleable solids in the liquor. Not only is more effective operation provided by such quieting, but an effective quiescent zone permits continuous operation, rather than periodic shut-off periods to allow for settling.

It is further desirable, that the amount of floatable material, such as over-aerated matter, allowed to accumulate in the settling compartments, and particularly in the final settling compartment 22, be kept to a very minimum. This floatable material or scum may tend to clog the sludge return line 72, but of even greater consequence, it may eventually find its way out of the final settling compartment 22 through the outlet 48 as part of the effluent of the system. The latter condition may progressively worsen to a point where it serves to prevent effective operation of the entire apparatus.

In order to achieve quick and effective quieting of the liquor 14 as it moves through the apparatus 10, and, further, to prevent accumulation of floatable material, a unique and highly effective method and structure have been devised, and said structure and method are incorporated in the illustrated apparatus 10.

The conducting conduit 54 of the conducting means 20 receives liquor 14 from the bottom of the aeration compartment 12 and delivers it to the top of the intermediate settling compartment 18 at about the operating level of the liquor in the latter compartment 18. The liquor at the bottom of the aeration compartment 12, particularly in the area adjacent pipe 54 and underlying the bottom of compartment 18, contains relatively little floatable material. Further, the discharge of the liquor at the narrowed top opening 50 of the intermediate settling compartment 18 creates some localized turbulence in the upper part of the compartment which serves to submerge any floatable material which is carried through to the intermediate compartment 18 and expedites the settling of settleable solids toward the bottom of the compartment. The remainder of the intermediate settling compartment 18, which has a downwardly enlarging horizontal cross section and a funnel-like bottom, is in a state of general quiescence, facilitating rapid settling-out of the settleable solids.

The liquor 14 passes through the opening 59 at the lowermost point of the intermediate settling compartment 18, and is discharged at a point slightly above the bottom of the final settling compartment 22. As seen best in FIG. 1, the converging construction of the lower half of the intermediate compartment 18 and the location of the opening 59 at about the point of convergence, together with the non-turbulent state of the two settling compartments, permits relatively smooth non-turbulent flow between the two compartments. The non-turbulent discharge of liquor near the bottom of the final compartment 22 facilitates the separation of the settleable material in the liquor from the other portion. As the quiescence of the final compartment 22 is not disturbed, the settleable material, which is heavier, is allowed to remain at the bottom of the final compartment, while the other portion of the liquor, which is lighter, will rise in that compartment and flow out of the outlet 48 as clear effluent. The baffle 60 blocks direct outflow from the surface of the liquor in the final compartment 22, thus blocking any floating matter which may reach that compartment.

The operation of the unit 62 serves to draw sludge from the bottom of the final settling compartment 22, through the sludge return line 72 back into the aeration compartment 12, for further oxidation in that compartment.

Thus, a structure and a method are illustrated which provide highly effective and rapid treatment of waste material liquor. In particular, there is an elimination of scum accumulation in the settling compartments with its undesirable effects.

Various other advantages features are provided, including rapid reduction of turbulence so as to provide an efficiently functioning settling compartment, and adequate sludge return and retention in the aeration compartment to effectively treat the waste material.

Obviously, various changes may be made in the particular embodiment described and shown in the drawings without departing from the scope and spirit of the invention.

Various features of the present invention are set forth in the following claims.

We claim:

1. A tank structure for treating waste material liquor, said tank structure comprising a treatment compartment for initial treatment of the liquor, said compartment being adapted to receive means for aerating the liquor in it at a point substantially below the surface of the liquor, an intermediate settling compartment for submerging floatable material and for allowing preliminary settling of the solids from the liquor, said intermediate compartment having a cross section at its upper end which is substantially reduced relative to its cross section over a major portion of its height, a conduit providing direct communication between a point adjacent the bottom of said treatment compartment and the reduced upper end of said intermediate settling compartment, said conduit spanning in at least one direction a substantial portion of said reduced upper end of said intermediate compartment, a final settling compartment for allowing final settling of solids from the liquor, means providing direct communication between the lower part of said intermediate compartment and the lower part of said final compartment, and means providing for discharge from the upper part of said final compartment.

2. A tank structure for treating waste material liquor, said tank structure comprising a plurality of walls defining a treatment compartment, an intermediate settling compartment, and a final settling compartment, said treatment compartment being adapted to receive means for aerating the liquor in it at a point substantially below the surface of the liquor, said intermediate settling compartment being arranged to submerge floatable material and allow preliminary settling of the solids from the liquor, said intermediate compartment having a reduced cross-section at its upper end which is substantially reduced relative to its cross-section over a major portion of its height, the walls of said intermediate compartment converging toward its lower end, a conduit providing direct communication between a point adjacent the bottom of said treatment compartment and the reduced upper end of said intermediate settling compartment, said conduit spanning in at least one direction a major portion of said reduced upper end of said intermediate compartment, a final settling compartment for allowing final settling of solids from the liquor, an opening in a wall of said intermediate compartment adjacent the convergence of the walls at the lower end of said intermediate compartment, said opening providing direct communication into the lower part of said final compartment, an outlet at the upper end of said final compartment for discharge of effluent therefrom, and a return line between the lower part of said final compartment and said treatment compartment.

References Cited in the file of this patent

UNITED STATES PATENTS

| | | |
|---|---|---|
| 2,061,564 | Drake et al. | Nov. 24, 1936 |
| 2,293,183 | Walker | Aug. 18, 1942 |
| 2,348,124 | Green | May 2, 1944 |
| 2,427,092 | Kamp | Sept. 9, 1947 |
| 2,573,941 | Walker et al. | Nov. 6, 1951 |
| 2,678,915 | Kalinske | May 18, 1954 |
| 2,897,149 | Griffith | July 28, 1959 |
| 3,053,390 | Wood | Sept. 11, 1962 |

OTHER REFERENCES

"The Aero-Accelator," a publication of Infilco Inc., Tucson, Arizona, Bulletin 6510-D, 1957, 15 pages.